No. 896,127. PATENTED AUG. 18, 1908.
P. J. LUTHARDT.
SEAT FOR WAGONS.
APPLICATION FILED FEB. 27, 1908.
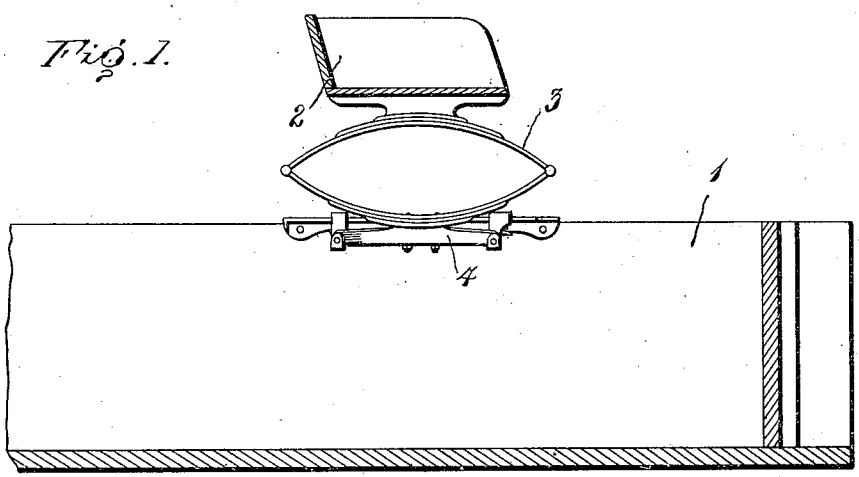
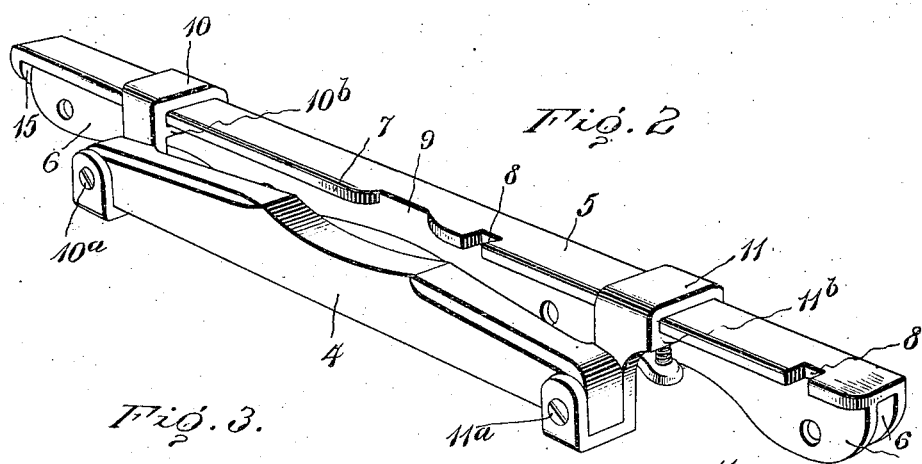
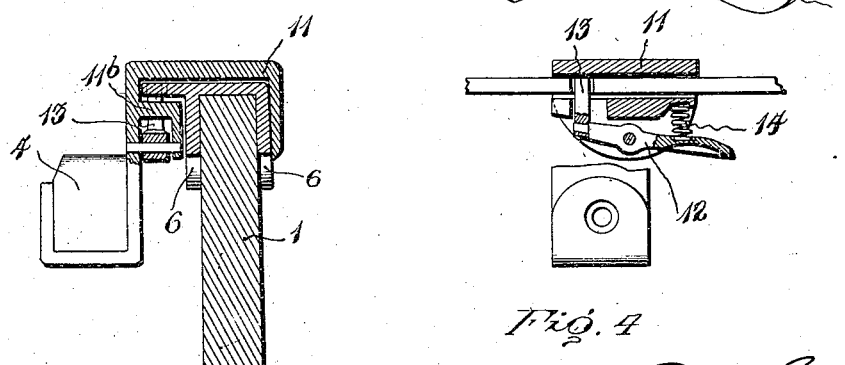
Witnesses
Helge A. Murray
S. E. Dodge
Inventor
P. J. Luthardt,
By Beeler & Robb
Attorneys

UNITED STATES PATENT OFFICE.

PHILIP J. LUTHARDT, OF SEYMOUR, WISCONSIN.

SEAT FOR WAGONS.

No. 896,127.　　　Specification of Letters Patent.　　　Patented Aug. 18, 1908.

Application filed February 27, 1908. Serial No. 418,134.

*To all whom it may concern:*

Be it known that I, PHILIP J. LUTHARDT, a citizen of the United States, residing at Seymour, in the county of Outagamie and State of Wisconsin, have invented certain new and useful Improvements in Seats for Wagons, of which the following is a specification.

This invention relates to seats for farm wagons, or the like, and particularly to the means for mounting or attaching such seats upon the wagon body. At the present time spring seats for wagons are secured upon the wagon body by hangers attached to the supporting bars for the springs, said hangers being arranged to engage over the sides of the wagon body and thereby support the seat thereupon. The common form of attaching means for wagon seats is disadvantageous because when the wagon passes over obstacles or obstructions, the jar often disengages the supporting means of the wagon seat from the wagon body and the driver upon said seat is sometimes injured by displacement thereof in the above manner. Furthermore, should the horses hitched to the wagon start to run away, it is a very common thing for the wagon seats now in use to be rearwardly thrown by disengagement of the supporting means from the wagon body, and the driver is thus often thrown from his seat and stopping of the runaway horses prevented, and the driver injured.

The present invention comprises essential novel attaching means for the wagon seat to eliminate the disadvantages before referred to.

For a full understanding of the invention and the details of construction thereof, reference is to be had to the following detail description and to the several views of the drawings, in which:

Figure 1 is a vertical sectional view showing the wagon seat supported upon the wagon body by the means comprising the present invention; Fig. 2 is a detail perspective view of one of the attaching devices for supporting the seat; Fig. 3 is a transverse sectional view showing the mounting of the latch-carrying hanger upon the longitudinal supporting member, and Fig. 4 is a vertical sectional view, parts broken away bringing out more clearly the mounting of the latch means upon the supporting hanger therefor.

Similar reference characters refer to similar parts throughout the following detail description and on the several views of the drawings.

In the drawings the numeral 1 designates the wagon body and the numeral 2 the seat thereof. Said seat 2 is supported by the usual elliptical springs 3, one being provided at each end of the seat, and supporting bars 4 being employed to support the springs 3 upon the attaching means comprising the present invention.

The attaching means for the seat 2 consists of a longitudinal supporting member 5, one of which is carried by each side of the wagon body 1, the member 5 being secured to the wagon body by fastenings which connect downwardly extending attachment flanges 6 thereto. The flanges 6 are spaced apart sufficiently to receive the side of the wagon body upon which the part 5 is mounted, said member 5 being thus rigidly attached to the body 1, it being designed to use any suitable fastenings such as screws or rivets for this purpose. The supporting member 5 is provided at its upper edge with a lateral flange 7 provided with a plurality of notches 8 at its front portion and a recess 9 at a point intermediate of its ends. Carried by the member 5 are the hangers 10 and 11, the hanger 10 being attached to one end of the spring supporting bar 4, as shown at 10$^a$ while the hanger 11 is similarly attached to the other end of the bar 4 as shown at 11$^a$. The hangers 10 and 11 are provided upon the middle portions thereof with interlocking extensions 10$^b$ and 11$^b$ respectively. Said extensions being arranged beneath the flange 7 of the member 5, when the hangers are in operative positions. The extensions 10$^b$ and 11$^b$ interlock the hangers from which they extend, with the supporting member 5, and in such a manner that the hangers cannot be displaced vertically when said extensions are engaged with the flange 7 in the manner described. The bar 4, with the hangers attached thereto, is adapted for slidable adjustment upon the member 5 and a latch device comprising a pivoted lever 12 having a catch 13, is mounted upon the hanger 11 in such a way that the catch 13 is adapted to engage with any one of the notches 8 to thereby hold the supporting parts of the seat 2 at a suitable adjustment. A spring 14 engages the lever 12 and normally tends to hold the catch 13 thereof in engagement with the flange 7.

The construction of the attaching means as above set forth is adapted to facilitate ready removal, as well as attachment, of the seat 2 upon the wagon body. In order to remove the seat 2 from the supporting member 5 it is only necessary to disengage the latch mechanism on the hanger 11, of each attachment, slide the seat 2 forwardly on the wagon body 1 until each hanger 10 is arranged so that its extension $10^b$ will register with the recess 9. The front hanger 11 will have been disengaged from the part 5 and the seat may be lifted readily from the attachment members 5 as soon as the extension $10^b$ registers with the recess 9 in the manner described. To place the seat in position upon the attachment members 5 it is only necessary to reverse the operation above described. The rearward movement of the seat upon the supporting members 5 is limited by stops 15 one of which projects from the rear extremity of each member 5 beneath the flange 7 thereof.

From the foregoing it will be readily apparent that the attaching means shown in Fig. 2 of the drawings may be arranged so that the hangers thereon are either upon the outside or the inside of the wagon body, as may be desired by the user. To reverse the positions of the attaching devices it is only necessary to interchange the same in order that they may be arranged with the front ends forward and disposed in proper positions to support the seat 2.

The many advantageous features of the invention will be apparent from the foregoing, it being understood that the size and detail construction of the parts may be modified in accordance with the broad spirit of the invention and the scope of the appended claims.

It will be understood that the hangers 10 and 11 may be used in the same way as are the common forms of hangers now in use, when it is desired to support the hangers on the lower wagon box, when the upper box is used. In other words the hangers 10 and 11 will be engaged over the upper edges of the sides of the lower wagon box and the upper box will be placed in its usual position supported by the lower box. The seat can be supported on the top box by said hangers in the same way as any other seat, should this be desired.

Having thus described the invention, what is claimed as new, is:

In combination, a wagon body comprising spaced sides, longitudinal seat supporting members attached to said sides and formed with lateral flanges, a seat, hangers attached to said seat, locking means for holding said hangers at a predetermined adjustment in the length of the supporting members aforesaid, said hangers being provided with extensions interlocking with the flanges above mentioned, and the flanges being formed with recesses of a width sufficient to permit the extensions of the hangers to pass therethrough in disengaging the same from the supporting members to remove the seat.

In testimony whereof I affix my signature in presence of two witnesses.

PHILIP J. LUTHARDT.

Witnesses:
CLARA BECKMANN,
F. R. DITTMER.